United States Patent

[11] 3,564,223

| | | |
|---|---|---|
| [72] | Inventors | Robert Herbert Harris<br>Farnborough;<br>Phillip Lance Owen, Church Crookham, England |
| [21] | Appl. No. | 734,298 |
| [22] | Filed | June 4, 1968 |
| [45] | Patented | Feb. 16, 1971 |
| [73] | Assignee | National Research Development Corporation<br>London, England |
| [32] | Priority | June 6, 1967 |
| [33] | | Great Britain |
| [31] | | 26,155/67 |

[54] DIGITAL DIFFERENTIAL ANALYZER
15 Claims, 7 Drawing Figs.

[52] U.S. Cl............................................235/150.31,
                                                235/150.3
[51] Int. Cl.........................................G06f 15/34
[50] Field of Search......................... 235/150.3,
       150.31, 150.4, 150.5, 150.51, 150.52, 150.53, 152

[56] References Cited
UNITED STATES PATENTS

| 3,035,768 | 5/1962 | Steele.......................... | 235/150.31 |
| 3,231,723 | 1/1966 | Gilliland et al. ............. | 235/150.4 |
| 3,419,711 | 12/1968 | Hunter et al................. | 235/150.31 |

*Primary Examiner*—Malcolm A. Morrison
*Assistant Examiner*—Joseph F. Ruggiero
*Attorney*—Cushman, Darby & Cushman

ABSTRACT: A digital differential analyzer is arranged to compute the sum of the first $n$ terms of a Taylor series representing a function of an independent variable where $n$ is an odd integer greater than unity. It includes means for detecting changes in the independent variable and comparing them with two or more standard increment sizes and calculating the effect of an increment of the nearest standard increment size on the value of the function. A specific example for calculating $\sin \theta$ and $\cos \theta$ is described.

DIGITAL DIFFERENTIAL ANALYZER

The present invention relates to digital differential analyzers and will be useful in applications requiring rapid and accurate calculations of algebraic functions of an independent variable, especially where the independent variable is continuously changing as is the case, for instance, in online control systems.

While analogue computers may be used for such calculations, they require special components and their accuracy is limited. Digital computers may be used to calculate functions, for instance by calculating terms of a Maclaurin series and summing them, but this involves several multidigit multiplications which take an appreciable time. In applications where the independent variable is continually changing, its value must be sampled at the beginning of each digital calculation, and the result obtained is likely to be in error by the extent of the effect of whatever change has occurred to the independent variable during the calculation. Hence the accuracy of the calculation is limited by the rate of change of the independent variable and the time taken to perform each calculation.

In a digital differential analyzer, a desired function is computed by cumulative additions of the effects of increments of the independent variable. The need for multidigit multiplications may be reduced or avoided by in effect quantizing the changes in the independent variable and thereby making each calculation a calculation of the effect of a unit increment. This decreases the time required for each calculation so that the true value of the function required has less opportunity to change before the calculated result is available.

It is usual to calculate the function approximately from the first two terms of a Taylor series expansion. However, the error inherent in such an approximation tends to be cumulative, causing a gradual drift of the computed values away from the correct values.

According to the present invention there is provided a digital differential analyzer for calculating a function of an independent variable arranged to compute the first $n$ terms of a Taylor series expansion of the function, where $n$ is an odd integer not less than three.

The drift which tends to occur when only two terms of the series are considered is due to the fact that the main term of the error involved in this approximation depends on the square of the increment in the independent variable and is therefore always of the same sign, so that the errors in successive steps have a cumulative effect. On the other hand, where three terms, or an odd number of terms are taken, the main term of the error involved depends on an odd power of the increment and will have a sign related to the sign of the increment. This has the desirable result that the errors in successive steps will tend to cancel out unless there is a preponderance of increments of one sign. The consideration of the third term and any further terms considered also naturally reduces the magnitude of the errors in each approximation relative to the magnitude of the increment involved.

According to a refinement of the present invention, there is provided a digital differential analyzer for computing values of a function of an independent variable, the analyzer including increment-detecting means for determining the sign of an incremental change in the independent variable and comparing its size with two or more predetermined standard increment sizes and providing an increment sign signal and an increment size signal indicative of the nearest of the predetermined standard increment sizes, and calculating means responsive to the increment sign signal and the increment size signal for calculating the effect on the function of an increment of the sign and size represented by the said signals. There may be, for instance, two predetermined standard increment sizes, which may be referred to as course increments and fine increments respectively. Where the numerical values involved in the calculations are expressed in binary digits, it is desirable that the predetermined standard increment sizes shall have values each expressible by a single binary digit; this allows multiplication by the value of an increment to be effected merely by a shift of the binary point, which is much quicker than an arbitrary multidigit multiplication. The use of increments of two or more suitably chosen sizes allows the analyzer to follow more rapid changes in the independent variable, and to approach the true value of the function more rapidly after any resetting operation.

In order that the invention may be clearly understood an embodiment thereof will now be described by way of example only. This embodiment is a digital differential analyzer for calculating values of the functions $\sin \theta$ and $\cos \theta$ from the Taylor series expansions $$\sin (\theta + \Delta\theta) = \sin \theta + \Delta\theta \cos \theta - \tfrac{1}{2}(\Delta\theta)^2 \sin \theta \quad (1)$$

and $\cos (\theta + \Delta\theta) = \cos \theta - \Delta\theta \sin \theta - \tfrac{1}{2}(\Delta\theta)^2 \cos \theta \quad (2)$ which may be expressed in the iterative forms $$X_{n+1} = X_n + \Delta\theta(Y_n - \tfrac{1}{2}\Delta\theta X_n) \quad (3)$$

and $Y_{n+1} = Y_n - \Delta\theta(X_{n+1} - \tfrac{1}{2}\Delta\theta Y_n) \quad (4)$ in which $\theta$ is the independent variable $\Delta\theta$ is an increment of the independent variable $X_n = \sin \theta$ $X_{n+1} = \sin (\theta + \Delta\theta)$ $Y_n = \cos \theta$ and $Y_{n+1} = \cos (\theta + \Delta\theta)$.

The description will be illustrated by reference to the accompanying drawings, of which:

Similar or corresponding parts are given similar or identical references wherever they occur in these drawings. Gate circuits are shown as circles enclosing a number which is the threshold of the gate, that is to say the number of its inputs which must have logical one signals applied to them in order to make the gate provide a logical one output signal. Thus an OR-gate is represented by a circle enclosing a 1.

Figure 1:
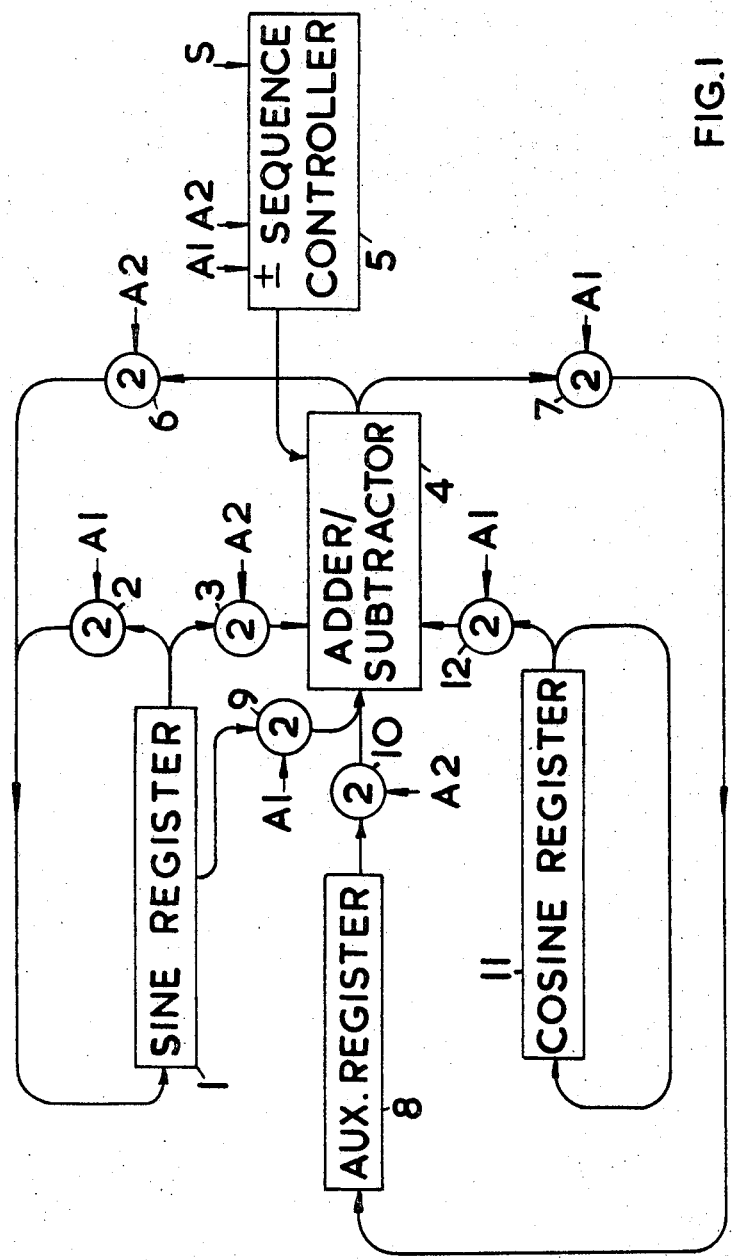
FIG. 1 is a schematic circuit diagram of arrangements for calculating $\sin (\theta + \Delta\theta)$ from equation (3)

FIG. 1 shows a shift register 1, which is used for storing values of $\sin \theta$ and $\sin (\theta + \Delta\theta)$ and is hereinafter called the sine register. An output from the last stage of the sine register 1 is connected to inputs of two AND-gates 2 and 3. The output of the AND-gate 3 is connected to a first input of an adder/subtractor circuit 4 which is controlled by a sequence controller 5. An output from the adder/subtractor 4 is connected to AND-gates 6 and 7. The outputs of the AND-gates 2 and 6 are connected to the input of the sine register 1, and the output of the AND-gate 7 is connected to the input of an auxiliary shift register 8. Outputs from an intermediate stage of the sine register 1 and from the end of the auxiliary register 8 are connected through AND-gates 9 and 10 respectively to a second input of the adder/subtractor 4. Another shift register 11, which is used for storing values of $\cos \theta$ and $\cos (\theta + \Delta\theta)$ and is hereinafter called the cosine register, has its last stage connected through an AND-gate 12 to the first input of the adder/subtractor 4. A recirculation path is connected from the last stage to the first stage of the cosine register. The AND-gates 2, 7, 9 and 12 are controlled by a timing signal A1, whereas the AND-gates 3, 6, and 10 are controlled by a timing signal A2. The timing signals A1 and A2 and an increment sign signal S are also applied to the sequence controller 5.

A calculation of $\sin (\theta + \Delta\theta) = X_{n+1}$ according to equation (3) is performed in two stages by the arrangement of FIG. 1.

During the first stage the timing signal A1 holds the gates 2, 7, 9 and 12 open while the gates 3, 6 and 10 are closed. For the present it will be assumed that the sine and cosine registers 1 and 11 initially contain digit signals representing sin $\theta$ and cos $\theta$ respectively. Other timing signals (not shown) cause the digit signals to be shifted along the registers so that they can be completely changed, or recirculated once, during the application of the timing signal A1.

During the first stage, the signals representing sin $\theta$ and cos $\theta$ are recirculated, so that they will still be available in their registers for use in the second stage. The digit signals from the cosine register 11 and the more significant signals from the sine register 1 are applied to the adder/subtractor 4 through the gates 12 and 9 respectively. The signals transmitted through the gate 9 represent $\frac{1}{2}\Delta\theta \sin \theta$; because they are taken from an intermediate tapping on the register 1 and are subtracted from signals from the least significant end of the cosine register 11, their significance is shifted and this shift is arranged to correspond to a multiplication by $\frac{1}{2}\Delta\theta$. If the increment $\Delta\theta$ is positive, the sequence controller 5 controls the adder/subtractor 4 to subtract the signals representing $\frac{1}{2}\Delta\theta \sin \theta$ from the signals representing $\cos \theta$. Hence the output of the adder/subtractor 4 represents [$\cos \theta - \frac{1}{2}\Delta\theta \sin \theta$] and this is applied to the auxiliary register 8. The auxiliary register 8 is shorter than the registers 1 and 11, so that the least significant digits of [$\cos \theta - \frac{1}{2}\Delta\theta \sin \theta$] pass right through it and are lost, so that the contents of the auxiliary register at the end of the first stage of calculation represent $\Delta\theta (\cos \theta - \frac{1}{2}\Delta\theta \sin \theta)$.

During the second stage of the calculation the contents of the cosine register 11 are preserved by recirculation as before. Meanwhile the signals representing $\Delta\theta (\cos \theta - \frac{1}{2}\Delta\theta \sin \theta)$ are passed through the gate 10 and the signals representing sin $\theta$ are passed through the gate 3 to the adder/subtractor 4. If $\Delta\theta$ is positive, the adder/subtractor 4 adds the signals applied to it, forming signals representing $\sin (\theta + \Delta\theta)$ and feeding them through the gate 6 to replace the signals for sin $\theta$ in the sine register 1.

Figure 2:
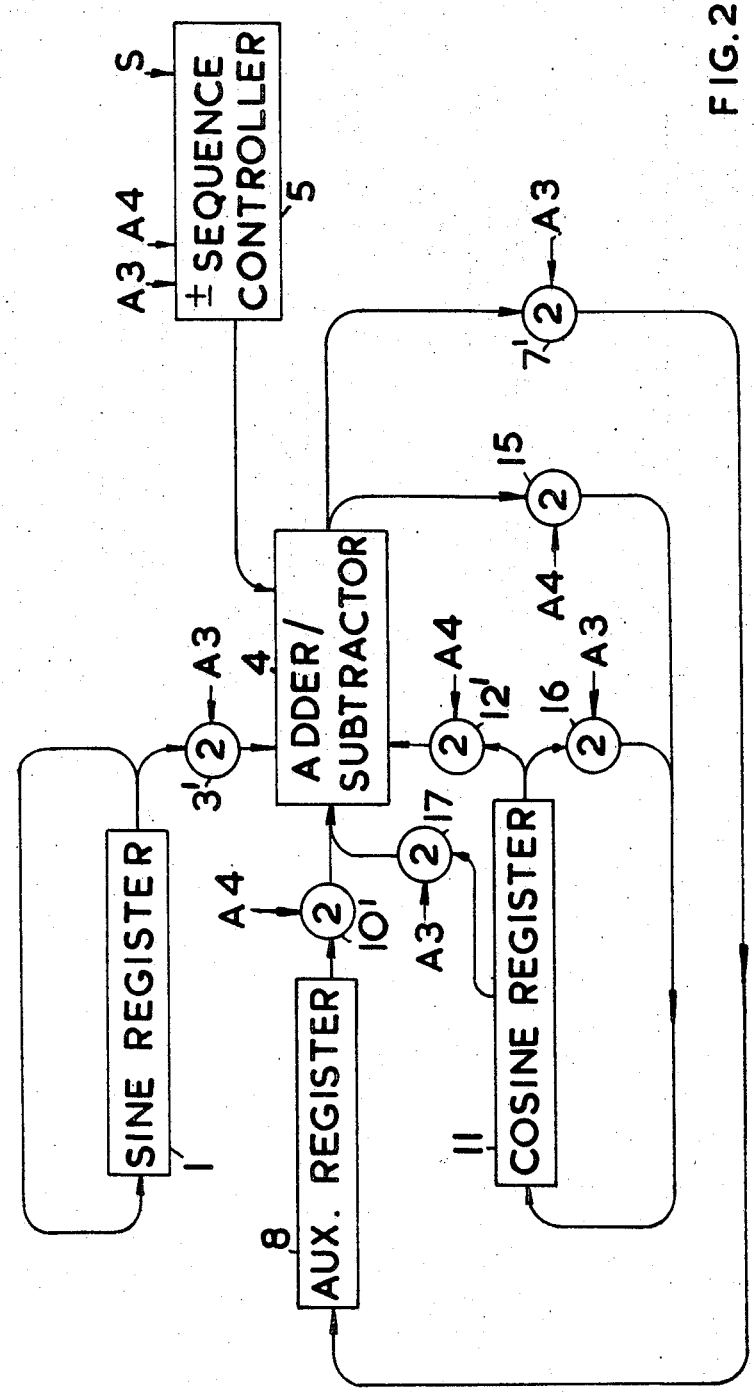
FIG. 2 is a schematic circuit diagram of arrangements for calculating $\cos (\theta + \Delta\theta)$ from equation (4)

FIG. 2 shows the same parts 1, 4, 5, 8 and 11 with the interconnections between them which are arranged for a calculation of $\cos (\theta + \Delta\theta)$ according to equation (4). In FIG. 2 the sine register 1 is shown with a recirculation path from its last stage to its first stage, and an output from its last stage connected through an AND-gate $3^1$ to the first input of the adder/subtractor 4. The output of the adder/subtractor 4 is connected through an AND-gate $7^1$ to the input of the auxiliary register 8 and through an AND-gate 15 to the first stage of the cosine register 11. The cosine register 11 has its last stage connected through an AND-gate $12^1$ to the first input of the adder/subtractor 4, and through an AND-gate 16 to its own first stage. The last stage of the auxiliary register 8 and an intermediate stage of the cosine register 11 are connected through AND-gates $10^1$ and 17 respectively to the second input of the adder/subtractor 4. The AND-gates $3^1$, $7^1$, 16 and 17 are controlled by a timing signal A3 whereas the AND-gates $10^1$, $12^1$ and 15 are controlled by a timing signal A4. The sequence controller 5 receives the timing signals A3 and A4 and the increment sign signal S and controls the adder/subtractor 4.

There is an obvious symmetry between the equations (3) and (4) and between the arrangements of FIG. 1 and FIG. 2; the main differences amount to an interchange of sine functions for cosine functions and of cosine functions for sine functions. The cosine functions and of cosine functions for sine functions. The cosine calculation proceeds in two stages. During the first of these stages the timing signal A3 opens the gates $3^1$, $7^1$, 16 and 17, signals representing $\sin (\theta + \Delta\theta)$ pass through the gate $3^1$ and signals representing $\frac{1}{2}\Delta\theta \cos \theta$ pass through the gate 17. If the increment $\Delta\theta$ is positive the adder/subtractor 4 subtracts the $\frac{1}{2}\Delta\theta \cos \theta$ signals from the sin $(\theta + \Delta\theta)$ signals, and its output establishes signals representing $\Delta\theta (\sin (\theta+\Delta\theta) - \frac{1}{2}\Delta\theta \cos \theta)$ in the auxiliary register 8. During the second stage of the cosine calculation, if $\Delta\theta$ is positive the adder/subtractor 4 subtracts the signals from the auxiliary register 8 from the cosine $\theta$ signals of the cosine register 11, forming signals which represent cosine $(\theta + \Delta\theta)$ and feeding them through the gate 15 into the cosine register 11.

If the increment $\Delta\theta$ is negative, the calculations proceed in a similar fashion, but in response to an increment sign signal $\overline{S}$ the sequence controller 5 will act to make the adder/subtractor 4 perform additions in place of subtractions, and subtractions in place of additions.

Figure 3:
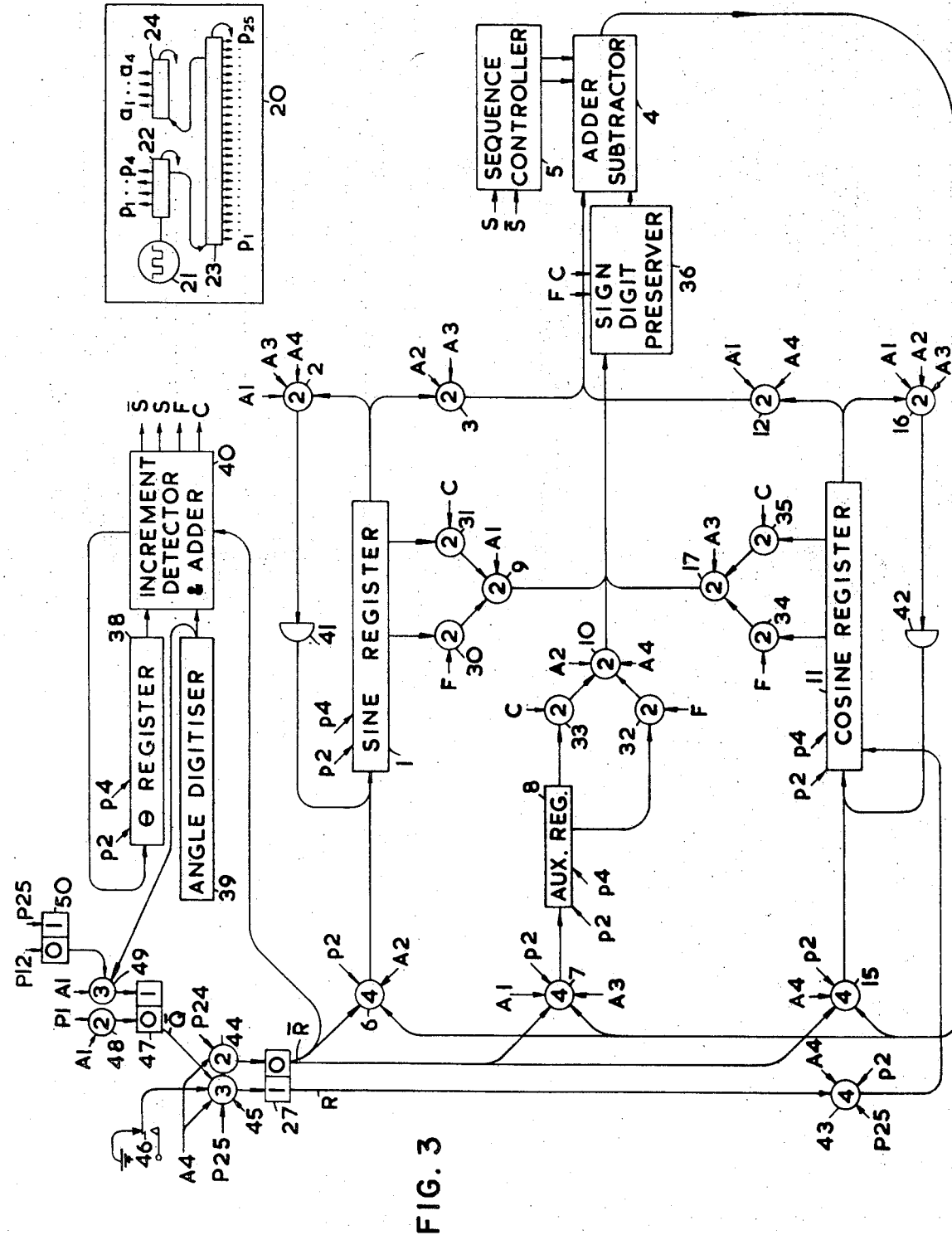
FIG. 3 is a more detailed schematic circuit diagram of a practical form of digital differential analyzer incorporating arrangements for calculating $\sin (\theta + \Delta\theta)$ and $\cos (\theta + \Delta\theta)$ of the sort shown in FIGS. 1 and 2 respectively.

In practice the timing signals A1, A2, A3 and A4 occur consecutively in a repetitive cycle, each cycle comprising one iterative step in which a sine calculation is followed by a cosine calculation. FIG. 3 shows the practical arrangement of the analyzer in greater detail. This incorporates the arrangements of FIG. 1 and FIG. 2, together with a timing signal generator, increment detecting means and means for resetting the sine and cosine registers to the values sine $0 = 0$ and cos $0 = 1$ respectively.

Figure 4A:
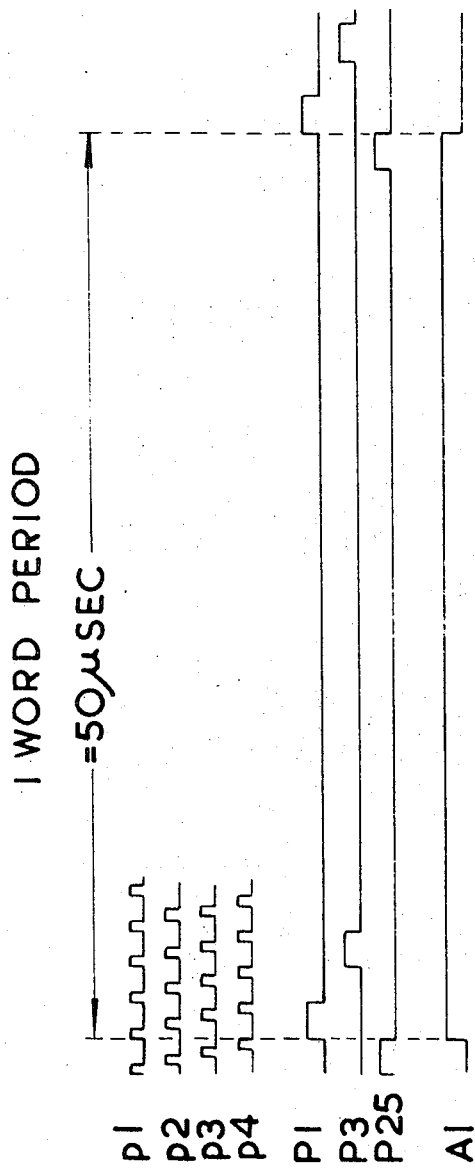
FIGS. 4a and 4b are sets of graphical diagrams on different time scales showing the relative timing of various timing and control waveforms which are used in the digital differential analyzer of FIG. 3.
Figure 4B:
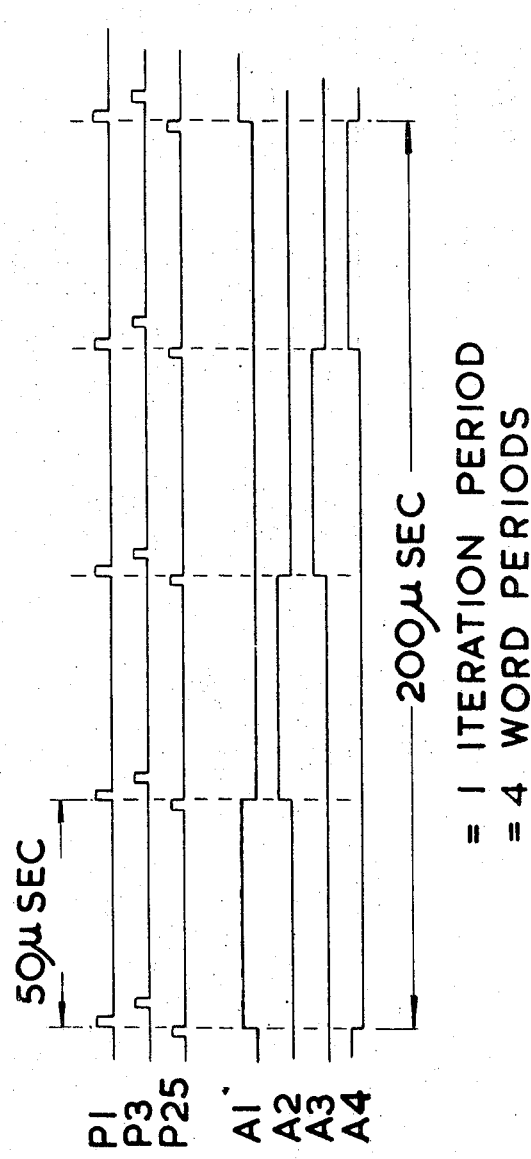

In FIG. 3, the gates 2 and 3 which are connected to the last stage of the sine register 1 are AND-gates of threshold two. The gate 2 has inputs connected to receive the timing signals A1, A3 and A4 while the gate 3 has inputs connected to receive the timing signals A2 and A3. Similarly the gates 12 and 16 are AND-gates of threshold two connected to the last stage of the cosine register 11 and connected to receive the timing signals A1 and A4, and A1, A2 and A3 respectively. A timing signal generator 20 includes a stable oscillator 21, a four-stage ring counter 22, a as-stage ring counter 23, and another four-stage ring counter 24. Outputs $p1$, $p2$, $p3$ and $p4$ are respectively connected to consecutive stages of the counter 22. The last stage of the counter 22 drives the counter 23. The 25 stages of the counter 23 are connected to separate outputs P1 to P25. The last stage of the counter 23 drives the counter 24. The four stages of the counter 24 are connected to separate outputs A1, A2, A3 and A4. These outputs A1, A2, A3 and A4 are the sources of the timing signals A1, A2, A3 and A4. The outputs $p1$, $p2$, $p3$, $p4$, P1 to P25 inclusive and A1, A2, A3 and A4 are connected to various points in the analyzer, as will be made apparent hereinafter. These connections are not fully shown in FIG. 3 to avoid confusing the drawing. The relative timing and duration of the signals $p1$, $p2$, $p3$, $p4$, P1, P3, P25 and A1 is shown by FIG. 4a. FIG. 4b, drawn to a smaller time scale than FIG. 4a, shows the relative time and durations of the signals P1, P3, P25, A1, A2, A3 and A4.

The outputs of the gates 3 and 12 on FIG. 3 are connected to one input of the adder/subtractor unit 4. The gates 6, 7 and 15 in the embodiment of FIG. 3 are AND-gates of threshold four. They each have one input connected to the output of the adder/subtractor unit 4, one input connected to receive a signal $\overline{R}$ from the O-state of a bistable circuit 27 and one input connected to receive the timing signal $p2$. In addition, the gate 6 has an input connected to receive the timing signal A2, the gate 15 has an input connected to receive the timing signal A4 and the gate 7 has inputs connected to receive the timing signals A1 and A3 respectively. The digitizer of the gates 6, 7 and 15 are connected to the inputs of the sine register 1, the auxiliary register 8, and the cosine register 11 respectively.

The sine register 1 has 24 stages. Its 12th and 16th stages are connected through AND-gates 30 and 31 respectively to inputs of the AND-gates 9. The auxiliary register 8 has 17 stages; its 13th and 17th stages are connected through AND-gates 32 and 33 respectively to inputs of the gate 10. The cosine register 11 has 24 stages; its 12th and 16th stages are connected through AND-gates 34 and 35 respectively to inputs of the gate 17. The outputs of the gates 9, 10 and 17 are connected through a sign digit preserving circuit 36 to the second input of the adder/subtractor 4.

A register 38, which is called the $\theta$-register and is used to hold the value of the angle $\theta$ whose sine and cosine are being computed, and an angle digitizer 39, are connected to inputs of an increment detector and adder circuit 40. This circuit 40 produces complementary increment sign signals S and $\overline{S}$ which are applied to the sequence controller 5 to direct the actions of the adder/subtractor 4. The circuit 40 also produces an output F, which is energized for the computation of the effects of a fine increment and controls the gates 30, 32 and 34, and an output C which is energized for the computation of the effects of a course increment and controls the gates 31, 33 and 35. The connections of these outputs of the circuit 40 are not fully shown to avoid confusing the drawing. The circuit 40 also has another output connected to the input of the θ-register 38.

The gates 9 and 17 are controlled by the timing signals A1 and A3 respectively. The gate 10 is connected to receive and be operated by the timing signals A2 and A4. The output of the gate 2 is connected through a delay unit 41 to the first stage of the sine register 1, and the output of the gate 16 is connected through a delay unit 42 to the first stage of the cosine register 11.

The resetting arrangements comprise the bistable circuit 27 and components connected to it. A O-state output R of the bistable circuit is connected to the gates 6, 7 and 15 as hereinbefore mentioned, and is also connected to the increment detector and adder circuit 40. A 1-state output R of the bistable circuit 27 is connected to an input of an AND-gate 43, which has a threshold of four, and has three other inputs connected to receive the timing signals A4, P25 and p2 respectively. The output of the gate 43 is connected to the second stage of the cosine register 11. An AND-gate 44 of threshold two has inputs connected to receive the timing signals A4 and P24, and its output is connected to a O-state setting input of the bistable circuit 27. An AND-gate 45 of threshold three has two inputs connected to receive the timing signals A4 and P25 respectively, one input connected to a resetting contactor 46 and one input connected to a O-state output $\overline{Q}$ of a bistable circuit 47. The bistable circuit 47 has O-state and 1-state setting inputs connected to the outputs of AND-gates 48 and 49 respectively. The AND-gate 48 has inputs connected to receive the timing signals A1 and P1. The AND-gate 49 has a threshold of three and inputs connected to receive the timing signal A1, the output of the angle digitizer 39, and a O-state output from a bistable circuit 50 respectively. The bistable circuit 50 has O-state setting and 1-state setting inputs connected to receive the timing signals P12 and P25 respectively. The registers 1, 8, 11 and 38 and a register (not shown) within the angle digitizer 39 have shift-controlling inputs connected to receive the timing signals $p2$ and $p4$.

The angle difitizer 39 includes an encoder driven by a shaft (not shown) and measures its angular position. Each revolution of the shaft is divided into $2^{13}$ (that is to say 8,192 equal angular increments, and the output of the angle digitizer represents a count of these increments in binary notation. The value of the angle $\theta$ is represented in the $\theta$ register 38 in the same terms, that is to say as a binary number of increments each of which is one 8,192nd part of $2\pi$ radians. However, to simplify the calculation the coarse and fine increments whose effects are calculated should be binary subdivisions of a radian, and in the present embodiment they are $2^{-7}$ and $2^{-11}$ radians respectively. The outputs of the angle digitizer 39 are sampled once in each cycle and if they differ in value from the contents of the $\theta$ register 38 by an amount justifying the addition of a fine increment, the increment detector 40 generates a signal F to set up the conditions for a calculation of the effects of a fine increment. If the outputs of the angle digitizer 39 differ in value from the contents of the register 38 by an amount justifying the addition of a course increment, the detector 40 suppresses its signal F and generates a signal C to set up the conditions for a calculation of the effects of a course increment. The increment detector 40 also generates a signal S, indicating the need for a positive increment, whenever the angle $\theta$ represented in the $\theta$ register 38 is less than the angle represented by the outputs of the angle digitizer 39, and generates a signal $\overline{S}$, indicating the need for a negative increment, whenever the angle represented in the register 38 is greater than the angle represented by the outputs of the angle digitizer 39. Towards the end of each cycle the increment detector 40 brings the $\theta$ register up to date by adding to its contents (or subtracting from them) the value of a course or fine increment when this is appropriate. The structure and operation of the increment detector 40 are more fully described hereinafter with reference to FIG. 6.

Each representation of sin $\theta$ in the sine register 1, and of cos $\theta$ in the cosine register 11, consists of a succession of 24 binary digits. The digit in the most significant position is called the sign digit and is used to indicate the sign of the value represented. The digit in the next most significant position, if it is a one, represents plus one in representations wherein the sign digit is zero, and represents minus one in representations wherein the sign digit is one. The succeeding positions have consecutively decreasing significance and are always positive, representing subdivisions of plus one. A one-digit in the least significant position represents a value of $2^{-22}$. Hence cos 41.4° = ¾ would be represented as 0011 followed by 20 zero digits, and cos 138.6° = −¾ would be represented as 1101 followed by 20 zero digits.

During the calculations, the digit signals are transmitted serially through the registers in the direction of decreasing significance, and issue from the last stages of the registers with the least significant digits leading. Since a fine increment is $2^{-11}$ radians and a course increment is $2^{-7}$ radians, multiplication by ½Δθ is equivalent to a right shift of 12 places for a fine increment or eight places for a course increment.

The timing signals $p2$ and $p4$ are applied to the shift inputs of the registers 1, 8 and 11 to move the digit signals in the direction of decreasing significance (that is towards the right in the drawings). When the effect of a positive fine increment is to be calculated, the digit signal from the last stage of the cosine register 11, which has a significance of zero or 1 times $2^{-22}$ in the value of cos $\theta$, is applied to the adder/subtractor 4 simultaneously with the digit signal of significance $2^{-10}$ from the 12th stage of the sine register 1. The latter digit signal in effect also represents the digit of significance $2^{-22}$ in the term ½Δθ sin $\theta$; it, and the subsequent more significant digits which follow it, are subtracted from the corresponding digits of cos $\theta$, and the resulting signals are fed into the auxiliary register 8. When the timing signal A2 commences, the digit signal of significance $2^{-11}$ in the term (cos $\theta$ − ½Δθ sin $\theta$) is transmitted through the gates 32 and 10 and through the sign digit preserver circuit 36, and simultaneously the digit signal of significance $2^{-22}$ in the representation of sin $\theta$ is transmitted through the gate 3 so that these signals are simultaneously applied to the inputs of the adder/subtractor 4. The adder/subtractor 4 therefore produces the digit signal of significance $2^{-22}$ for the representation of sin ($\theta + \Delta\theta$). The representation of sin ($\theta + \Delta\theta$) is gradually shifted into the sine register 1 from the left through the gate 6, as subsequent digit signals pass through the gates and are added together in the adder/subtractor unit 4.

When the timing signal A3 occurs, signals flow through the gates 34, 17, 3 and 7 so that a representation of (sin ($\theta+\Delta\theta$) − ½Δθcosθ) is formed in the auxiliary register 8 as hereinbefore explained with reference to FIG. 2. When the timing signal A4 occurs, the digit signals from the auxiliary register 8 and the cosine register 11 are applied to the adder/subtractor 4 to generate the representation of cos ($\theta + \Delta\theta$) which is shifted into the cosine register 11 from the left via the gate 15.

A calculation of the effect of a positive course increment proceeds in a similar manner but the signals are taken through the gates 31, 33 and 35 instead of the gates 30, 32 and 34. This gives the effect of multiplication by $2^{-8}$ (half a course increment) in the first and third parts of the calculation, and of multiplication by $2^{-7}$ (one course increment) in the second and fourth parts of the calculation.

In the course of the multiplying operations, the sign digits are shifted into positions which have a positive significance. This is immaterial when the sign digit is a zero digit, but necessitates special arrangements for dealing with any sign digit which is a one digit. These are provided by the sign digit preserver circuit 36. The normal digit signals are transmitted by the circuit 36 with no substantial change. However at the times when a sign digit is due to arrive at the circuit 36, it is put into a repeating condition so that its output repeats the sign digit signal until it is reset by the end of the next P25 timing signal. For instance when $\sin \theta = -\frac{3}{4}$ and the effect of a positive fine increment is being calculated, the signals passed through the gate 9 are eight zeros followed by a one, a zero, and two ones. Just before the last one-digit signal in this sequence arrives, the sign digit preserver circuit 36 is put into its repeating condition so that in its output the last one is repeated 12 times. The adder/subtractor 4 therefore subtracts 11111111111110100000000 from the representation of cos $\theta$. The subtraction of the string of one digits derived from the sign digit of sin $\theta$ is equivalent to the addition of a one digit in the 14th place, that is to say equivalent to the addition of $2^{-12}$ or $\frac{1}{2}\Delta\theta$. The least significant digits of the subtrahend actually represent $\frac{1}{2}\Delta\theta$ times the complement of $$|\sin \theta|,$$

that is to say $$\tfrac{1}{2}\Delta\theta (1 - |\sin \theta|)$$

or $\frac{1}{2}\Delta\theta$ times $\frac{1}{4}$ in the present example. The net effect of the whole subtraction is the same as the addition of $$\tfrac{1}{2}\Delta\theta |\sin \theta|$$

which is the desired effect; $\frac{1}{2}\Delta\theta \times \frac{3}{4}$ has been added by processes equivalent to adding $\frac{1}{2}\Delta\theta \times 1$ and subtracting $\frac{1}{2}\Delta\theta \times \frac{1}{4}$.

The registers 1 and 11 may be reset when desired, to cancel effects due to any cumulative errors, by operating the resetting contact or push button 46. This causes the bistable circuit 27 to be put into its 1-state at the end of the current iteration period, so that its output R ceases and the gates 6, 7 and 15 are closed. Any sign digit in the representation of cos $\theta$ is thereby prevented from entering the cosine register 11. The existing representation of sin $\theta$ is discarded in the second part of the next iteration period, while the recirculation path is blocked at the gate 2. A one digit signal is inserted in the second most significant position of the cosine register 11 through the gate 43, to form a representation of cos $0 = 1.0$ when the rest of the representation of cos $\theta$ is discarded during the fourth part of the period, while its recirculation path is blocked at the gate 16. The bistable circuit 27 is reset on the occurrence of the timing signals A4 and P24, allowing normal operation, as hereinbefore described, to recommence. The components 47 to 50 inclusive are arranged to provide an automatic reset whenever the angle $\theta$ becomes zero. This prevents any carrying over of any accumulation of rounding-off errors from one revolution to another.

Figure 5:
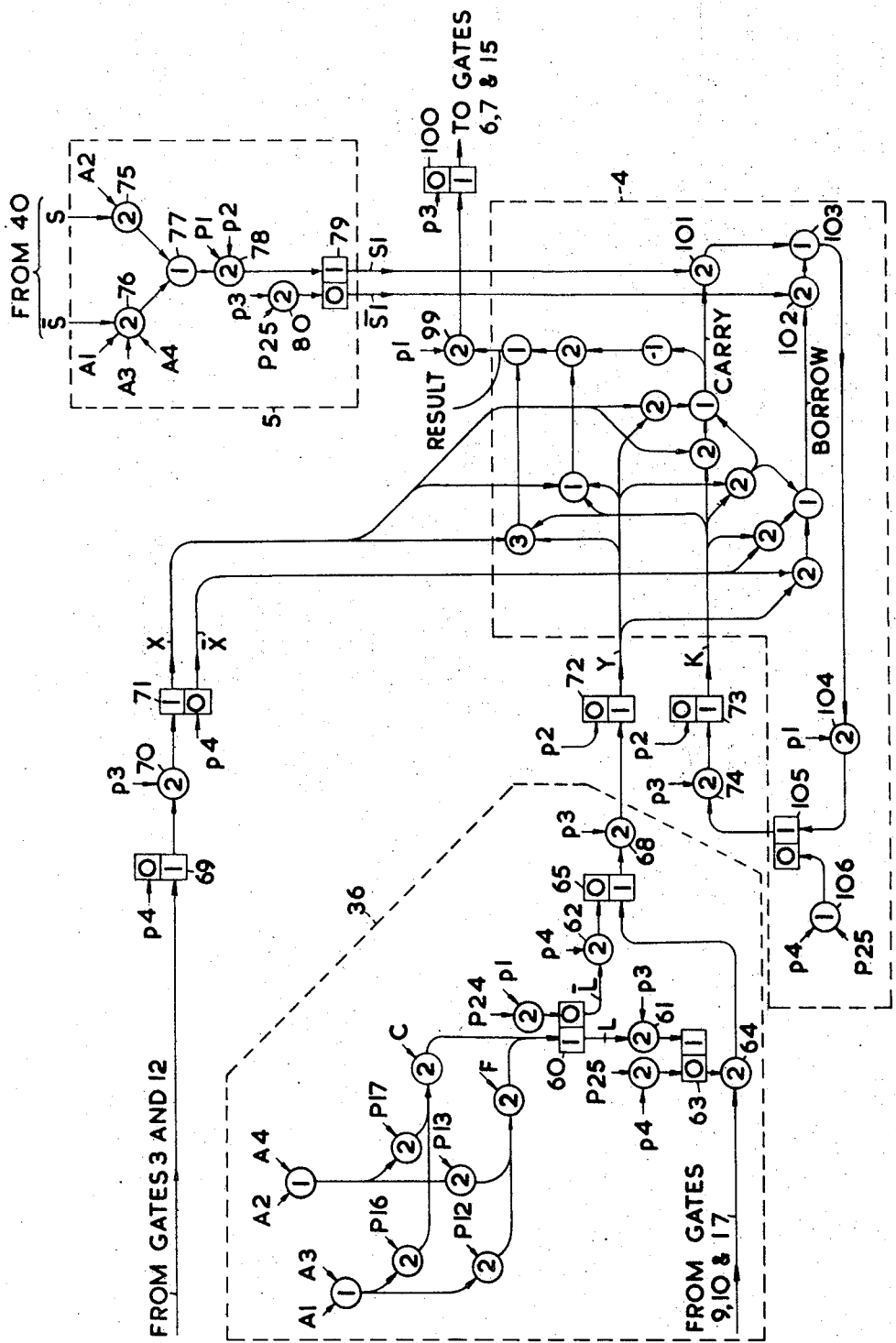
FIG. 5 is a circuit diagram of parts of the analyzer of FIG. 3 used to perform the additions and subtractions needed for the calculations described.

FIG. 5 shows in detail the sign digit preserver circuit 36, the adder/subtractor circuit 4, the sequence controller 5 and some ancillary parts used in the connections to these parts. The sign digit preserver circuit 36 includes an arrangement of gates, connected to receive various timing signals from the timing signal generator 20, and the increment size signals F and C from the increment detector 40 (FIG. 3). These gates are arranged to put a bistable circuit 60 into its 1-state whenever a sign digit is due to arrive from either of the gates 9, 10 or 17 (FIG. 3), and to reset the bistable circuit 60 back to its O-state at the end of each iteration period. Outputs L and $\overline{L}$ from the 1-state and the O-state respectively of the bistable circuit 60 are connected to inputs of AND-gates 61 and 62 respectively. The AND-gate 61 is controlled by the timing signal $p3$ and has an output connected to a 1-state setting input of the bistable circuit 63. The O-state of this bistable circuit 63 is arranged to be reset on the concurrence of the timing signals P25 and $p4$, and to control the passage of signals from the gates 9, 10 and 17 by means of a gate 64. The AND-gate 62 is controlled by the timing signal $p4$. Outputs from the gates 62 and 64 are applied to O-state and 1-state setting inputs respectively of a bistable circuit 65. The 1-state of the bistable circuit 65 has an output Bowhich is connected to a gate 68.

Signals from the gates 3 and 12 (FIG. 3) are connected to a 1-state setting input of a bistable circuit 69. An AND-gate 70 has inputs respectively connected to receive the timing signal $p3$ and a 1-state output of the bistable circuit 69, and an output connected to a 1-state setting input of a further bistable circuit 71. The bistable circuits 69 and 71 have O-state resetting inputs connected to receive the timing signal $p4$.

Another bistable circuit 72 has a 1-state setting input connected to the output of the gate 68 and a O-state resetting input connected to receive the timing signal $p2$. Yet another bistable circuit 73 has a 1-state setting input connected to the output of an AND-gate 74 and a O-state resetting input connected to receive the timing signal $p2$. The AND-gates 70, 68 and 74 are controlled by the timing signal $p3$. Outputs X, Y and K, from the 1-states of the bistable circuits 71, 72 and 73 respectively, form the digit signal inputs to the adder/subtractor 4. The output K represents any carry or borrowed digit; the input to the gate 74 which controls the output K is derived from an output of the adder/subtractor circuit 4. The complementary output $\overline{X}$ from the O-state of the bistable circuit 71 is also connected to an input of the adder/subtractor circuit 4.

The sequence controller 5 includes AND-gates 75 and 76, of threshold two, connected to receive the increment sign signals S and $\overline{S}$ respectively. The gate 75 is controlled by the timing signal A2 whereas the gate 76 has inputs connected to receive the timing signals A1, A3 and A4. Outputs of the gates 75 and 76 are connected through an OR-gate 77 to an input of another AND-gate 78, of threshold two. The gate 78 has inputs connected to receive the timing signals P1 and $p2$, and its output is connected to a 1-state setting input of a bistable circuit 79. The 1-state and the O-state of the bistable circuit 79 respectively provide outputs S1 and $\overline{S1}$ for controlling the adder/subtractor 4. An AND-gate 80 is connected to receive the timing signals P25 and $p3$, and its output is connected to a O-state resetting input of the bistable circuit 79.

The adder/subtractor circuit 4 includes an arrangement of gates for deriving the following logical combinations of the inputs X, $\overline{X}$, Y and K:

Carry $= X.Y + K.X + K.Y$         (5)
Borrow $= \overline{K}.Y + \overline{X}.K + K.Y$         (6)
Sum or Difference $= (\overline{\text{Carry}}) (X + Y + K) + X.Y.K$   (7)

In these equations (5), (6) and (7), a dot or bracket represents a logical product or concurrence, that is to say the result of an AND operation, while a plus sign $+$ represents an inclusive OR operation, and a bar —— signifies inversion; thus $\overline{\text{Carry}}$ is the inverse of the carry signal.

The sum or difference output of the adder/subtractor 4, representing the logical combination of equation (7), is connected to an AND-gate 99. The AND-gate 99 is controlled by the timing signal $p1$ and its output is connected to a 1-state setting input of a bistable circuit 100. The bistable circuit 100 has a 1-state output which is connected to the inputs of the gates 6, 7 and 15 of FIG. 1, and a O-state resetting input connected to receive the timing signal $p3$.

The complementary outputs S1 and $\overline{S1}$ from the sequence controller circuit 5 control AND-gates 101 and 102 respectively. The carry output (equation 5) of the adder/subtractor 4 is applied to the gate 101, whereas the borrow output (equation 6) is applied to the gate 102. Outputs of the gates 101 and 102 are connected through an OR-gate 103 to an AND-gate 104. The AND-gate 104 is controlled by the timing signal $p1$, and its output is connected to a 1-state setting input of a bistable circuit 105. The bistable circuit 105 has a 1-state output connected to the input of the AND-gate 74, and has a O-state resetting input connected to the output of an OR-gate 106. The ORigate 106 is connected to transmit the timing signals $p4$ and P25.

At the end of a word period, the timing signals reset the bistable circuits 60, 63 and 65 into their O-states so that the gates 62 and 64 are opened in readiness for the next word period. Each one digit signal from the gates 9, 10 or 17 passes through the gate 64 (while the timing signal $p2$ is occurring) and puts the bistable circuit 65 into its 1-state. When the timing signal $p3$ occurs, the digit signal is transmitted through the gate 68 to set up the bistable circuit 72 in its 1-state. While digit signals not derived from any sign digit are being transmitted, the bistable circuits 65 and 72 are reset by timing signals in every digit period, but when a shifted sign digit signal is due to arrive, the bistable circuits 60 and 63 are put into their 1-state. This closes the gates 62 and 64, inhibiting any further setting or resetting of the bistable circuit 65. Hence the digit signal derived from the sign digit is repeated in the output from the gate 68 at every occurrence of the timing signal $p3$ until the end of the word period. Thus the circuit 36 shown provides the desired sign digit preserving action.

Figure 6:
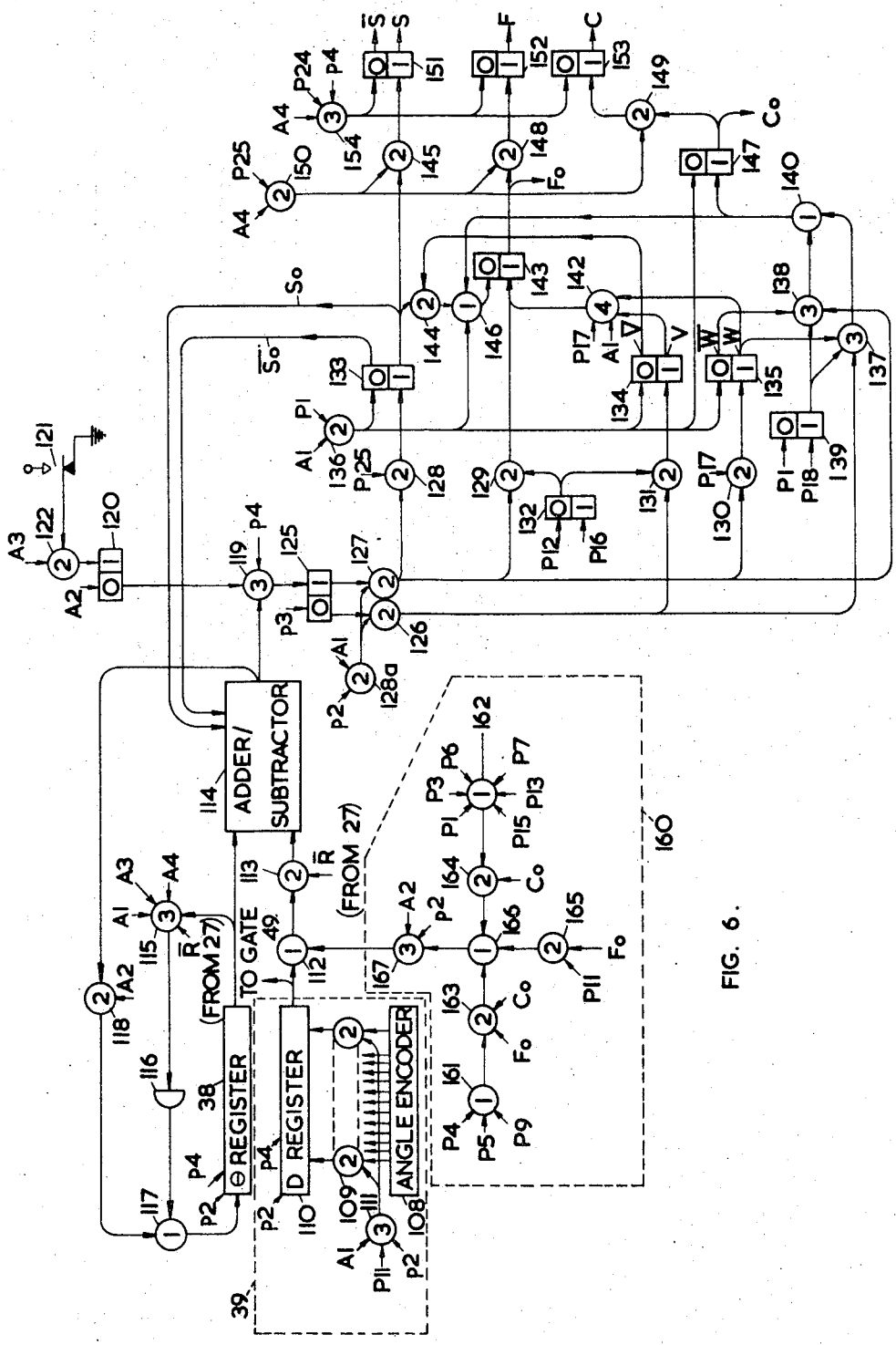
FIG. 6 is a circuit diagram of increment-detecting and increment-adding parts of the digital differential analyzer of FIG. 3.

When the effects of a positive increment are being calculated, the adder/subtractor circuit 4 is required to subtract, add, subtract, and subtract, in the four consecutive word periods characterized by the timing signals A1, A2, A3 and A4 respectively. This is arranged by the sequence controller 5; in response to an increment sign signal S, indicating a positive increment, the gate 75 transmits the timing signal A2 so that the bistable circuit 79 is put in its 1-state during the second word period of the iteration. Conversely, when the effects of a negative increment are to be calculated, the adder/subtractor 4 must be controlled to add, subtract, add, and add respectively in the word periods characterized by the timing signals A1, A2, A3 and A4. It is therefore arranged that an increment sign signal $\overline{S}$, representing a negative increment, will open the gate 76, allowing the timing signals A1, A3 and A4 to pass so that the bistable circuit 79 is put into its 1-state during the first, third and fourth word periods of the iteration. The bistable circuit 79 is reset to its O-state by timing signals at the end of each word period. When the bistable circuit 79 is in its 1-state, its output S1 opens the gate 101 allowing the carry output (equation 5) to be passed to the K input of the adder/subtractor 4. When the bistable circuit 79 is in its O-state, its output $\overline{S1}$ opens the gate 102 allowing the borrow output (equation 6) to be passed to the K input of the adder/subtractor 4. The bistable circuit 105 and the gates 104, 106 and 74 ensure the necessary delay of one digit period and the correct retiming of the K input. With the binary notation and the arrangement of shift registers adopted in the present embodiment, the distinctions between the carry signal (equation 5) and the borrow signal (equation 6) are the only substantial distinctions between the processes of addition and subtraction. FIG. 6 shows in detail the arrangement of the angle digitizer 39, and the increment detector and adder circuit 40 and its connections to the register 38. The angle digitizer 39 includes an encoder 108, a set of AND-gates 109, and a 13-stage register 110. The AND-gates 109 are connected to the outputs of the encoder 108 and controlled by the output of a gate 111. The gate 111 is an AND-gate of threshold three, connected to receive the timing signals $p2$, P11 and A1.

The register 110, which is known as the D-register, is arranged to receive binary signals from the outputs of the set of gates 109 as a parallel input, and to transmit them in serial form with the least significant digit leading, through an OR-gate 112 to a gate 113. The output of the gate 113 and the last stage of the $\theta$-register 38 are connected to separate inputs of an adder/subtractor circuit 114. The adder/subtractor circuit 114 is identical to the adder/subtractor circuit 4 which is shown in detail in FIG. 5. The $\theta$-register 38 is also provided with a recirculation path leading from its last stage through a gate 115, a delay element 116 and an OR-gate 117 to its first stage. The gate 115 is an AND-gate of threshold three connected to receive the timing signals A1, A3 and A4 and the signal $\overline{R}$ from the bistable circuit 27 of the register resetting arrangements (FIG. 3). The signal R also controls the gate 113.

The output of the adder/subtractor circuit 114 is connected to gates 118 and 119. The gate 118 is controlled by the timing signal A2 and its output is connected to the first stage of the $\theta$-register 45 through the OR-gate 117. The gate 119 is an AND-gate of threshold three, connected to receive the timing signal $p4$ and an output from the O-state of a bistable circuit 120. A pushbutton switch 121 has a normally closed contact connected to earth and a normally open contact connected to receive the voltage representing a 1-digit signal, and its moving arm is connected to a gate 122. The gate 122 is controlled by the timing signal A3 and its output is connected to a 1-state setting input of the bistable circuit 120. The bistable circuit 120 also has a O-state resetting input connected to receive the timing signal A2.

A bistable circuit 125 has a 1-state setting input connected to the output of the gate 119, and a O-state resetting input connected to receive the timing signal $p3$. Outputs from the O-state and the 1-state of the bistable circuit 125 are connected to AND-gates 126 and 127 respectively. These AND-gates 126 and 127 are controlled by the output of an AND-gate 128a which is connected to receive the timing signals A1 and $p2$. The output of the gate 127 is connected to inputs of AND-gates 128, 129 and 130. The output of the gate 126 is connected to an AND-gate 131. A bistable circuit 132 has and 1-state setting inputs connected to receive the timing signals P12 and P16 respectively, and has a O-state output which controls the gates 129 and 131. The gates 128 and 130 are controlled by the timing signals P25 and P17 respectively. The outputs of the gates 128, 131 and 130 are connected to 1-state setting inputs of bistable circuits 133, 134 and 135 respectively. O-state resetting inputs of these three bistable circuits 133, 134 and 135 are connected to the output of an AND-gate 136 which is connected to receive the timing signals A1 and P1.

The bistable circuit 135 has a 1-state output W and a O-state output $\overline{W}$ which are connected to inputs of gates 137 and 138 respectively. The gates 137 and 138 are AND-gates of threshold three; they each have one input connected to receive a 1-state output from a bistable circuit 139, and their outputs are connected to an OR-gate 140. The gate 137 has a third input connected to the output of the gate 126 and the gate 138 has a third input connected to the output of the gate 127. O-state and 1-state setting inputs of the bistable circuit 139 are connected to receive the timing signals P1 and P18 respectively. An AND-gate 142, of threshold four, has separate inputs connected to receive the timing signals A1 and P17, the output W from the 1-state of the bistable circuit 135, and an output V from the 1-state of the bistable circuit 134. The outputs of the gates 129 and 142 are connected to a 1-state setting input of a bistable circuit 143.

Complementary outputs So and $\overline{So}$ from the 1-state and the O-state respectively of the bistable circuit 133 are connected to the controlling inputs of the adder/subtractor circuit 114. The 1-state output So is also connected to inputs of AND-gates 144 and 145. The gate 144 is controlled by an output $\overline{V}$ from the O-state of the bistable circuit 134. Outputs from the gates 140, 144 and 136 are connected through an OR-gate 146 to a O-state resetting input of the bistable circuit 143. A further bistable circuit 147 has a 1-state setting input connected to the output of the OR-gate 140 and O-state resetting input connected to the output of the AND-gate 136.

The bistable circuits 143 and 147 have 1-state outputs Fo and Co respectively, which are connected to gates 148 and 149 respectively, and are also connected to parts of an increment value insertion circuit 160 which is described hereinafter. The gates 145, 148 and 149 are controlled by the output of an AND-gate 150 which is connected to receive the timing signals A4 and P25. The outputs of the gates 145, 148 and 149 are connected to the 1-state setting inputs of bistable circuits 151, 152 and 153 respectively O-state resetting inputs of the bistable circuits 151, 152 and 153 are connected to the output of a gate 154, which is an AND-gate of threshold three, connected to receive the timing signals A4, P24 and P4. The bistable circuit 151 has O-state and 1-state outputs which provide the complementary increment sign signals $\bar{S}$ and S respectively. The bistable circuits 152 and 153 have 1-state outputs which provide the fine increment signal F and the coarse increment signal C respectively.

The increment value insertion circuit 160 comprises an OR-gate 161 connected to receive the timing signals P4, P5 and P9, an OR-gate 162 connected to receive the timing signals P1, P3, P6, P7, P13 and P15, an AND-gate 163 connected to receive the output of the OR-gate 161 and the signals Fo and Co, an AND-gate 164 connected to receive the output of the OR-gate 162 and the signal Co, an AND-gate 164 connected to receive the timing signal P11 and the signal Fo, an OR-gate 166 connected to the outputs of the AND-gates 163, 164 and 165, and a gate 167 connected to the output of the OR-gate 166. The gate 167 is an AND-gate of threshold three having inputs connected to receive the timing signals A2 and p2, and its output is connected to the OR-gate 112.

The increment detector and adder circuit of FIG. 6 has to compare the digit signals from the angle encoder 108 with the digit signals held in the θ-register 38, determine the sign of the difference (that is to say which set of digit signals represents the greater angle), determine whether or not the difference warrants the addition of a fine increment or of a coarse increment, and add signals representing the value of each increment computed to the signals in the θ-register to keep it up to date and consistent with the signals in the size register and the cosine register. These functions are performed in each iteration period to obtain the increment size and increment sign signals which will control the calculations in the next following iteration period. Thus the calculations made in each iteration period are in fact based on the increment detected in the preceding iteration period, and the increment will be added to the θ-register 50 microseconds before its effects are entered in the sine register and 75 microseconds before its effects are entered in the cosine register.

As hereinbefore mentioned, angles are represented in the θ-register 38, the output of the angle encoder 108 and the increment detector and adder circuit by binary numbers of angular increments, whereas the fine increments and coarse increments used in the calculation are $2^{-}$ and $2^{-7}$ radian respectively. A one in the least significant digit position in the 13 digits of the angle encoder output represents $\pi/2$ fine increments. To reduce the cumulative rounding-off errors, the θ-register 38 is extended to 24 stages.

During the first quarter of each iteration period, the digit signals representing θ are shifted along and out of the θ-register 38 with the least significant digits leading. They are applied to the adder/subtractor circuit 114, and are also recirculated via the gate 115, the delay unit 116 and the gate 117 so that they will be available for use again in the second quarter of the iteration period. As the 11th digit signal leaves the θ-register 38, the gates 109 are opened and the outputs of the angle encoder 108 are entered in the D-register 110. The digit signals from the D-register 110 are thereafter shifted along through the gates 112 and 113 and applied to the adder/subtractor circuit 114 in synchronism with the corresponding digit signals from the θ-register 38. The output signals of the adder/subtractor circuit 114, which represent the digits of the angular difference θ−D, normally pass through the gate 119 and each one digit signal thereof puts the bistable circuit 125 into its 1-state.

The most significant digit signal of θ−D passes through the gate 128 and is used to set up positive increment signals $\bar{So}$ and S, if it is a one signal, or negative increment signals So and $\bar{S}$, if it is a zero signal. This makes the calculated values of sin θ and cos θ approach the required values by the shortest route after any resetting operation. For instance, if the apparatus has just been reset to read θ = 0), sin θ = 0, cos θ = 1.0 and the output of the angle encoder represents an angle between 180° and 360°, negative increment signals will be generated and the effects of a negative increment computed when the reset contactor (46, FIG. 3) is released. The signal So prepares the adder/subtractor circuit 114 for the addition of the value of a positive increment during the second quarter of the iteration period; conversely the signal $\bar{So}$ sets the adder/subtractor 114 for a subtraction.

The operation of the adder/subtractor circuit 114 involves a delay of one digit period. Hence the bistable circuit 132 is in its O-state and the gates 129 and 131 are opened at the appropriate time to pass the 11th to 15th least significant digit signals of θ-D to the bistable circuits 134 and 143. If one or more of these digit signals is a one signal, the bistable circuit 143 is put into its 1-state and produces a signal Fo. If all of the 11th to 15th digit signals of θ-D are one signals, the bistable circuit 134 remains in its O-state and the gate 144 is held open; if the 24th digit signal is another one signal, the positive increment sign signal So which it causes will then reset the bistable circuit 143, canceling the fine increment signal Fo. However, if one or more of the 11th to 15th digits is a zero signal, its inverse will pass through the gate 131 and put the bistable circuit 134 into its 1-state. If the 16th digit signal is a one signal, it passes through the gate 130 and puts the bistable circuit 135 into its 1-state, allowing the gates 137 and 142 to be opened. The inverse of any subsequent zero digit signal in the representation of θ-D will then set the bistable circuit 147 and reset the bistable circuit 143 to produce a coarse increment signal Co and cancel the fine increment signal Fo if it was previously set up. If the 11th to 15th digit signals are all zero and the 16th and all subsequent signals are all ones, then the gate 142 operates to set up a fine increment signal Fo. If the 16th digit signal is a zero signal the bistable circuit 135 remains in its O-state and only the gate 138 is opened. In this case, any subsequent one digit signal will set the bistable circuit 147 and reset the bistable circuit 143. The various possible values of θ−D, and the consequent reactions of the circuit are summarized in table I.

TABLE I

| digits of θ-D | | | signals derived | | | Notes |
|---|---|---|---|---|---|---|
| 24th | 16th 15th | 11th | Fo | Co | So | |
| 01111111 to 00000001 | 11111 to 00000 | 111111111 to 0000000000 | 1 or 0 | 1 | 0 | Co set via 137 or 138, cancels any Fo |
| 00000000 to 00000000 | 11111 to 00001 | 111111111 to 0000000000 | 1 | 0 | 0 | Fo set via 129 |
| 00000000 to 00000000 | 00000 to 00000 | 111111111 to 0000000000 | 0 | 0 | 0 | |
| 11111111 to 11111111 | 11111 to 11111 | 111111111 to 0000000000 | 1 | 0 | 1 | Fo cancelled via 144 |
| 11111111 to 11111111 | 11110 to 00001 | 111111111 to 0000000000 | 1 | 0 | 1 | Fo set via 129 and 142 |
| 11111111 to 11111111 | 00000 to 00000 | 111111111 to 0000000000 | 1 | 0 | 1 | Fo set via 142 |
| 11111110 to 00000000 | 11111 to 00000 | 111111111 to 0000000000 | 1 or 0 | 1 | 1 | Co set via 138 or 137, cancels any Fo |

Entries in this table indicate conditions in which an Fo signal is set up and then canceled. It should be remembered that the digit signals are numbered in order as they are brought forward for examination with the least significant digit signal leading, so that the 24th digit signal is the most significant one. To make the table clearer the digit signals are shown in three groups, the central group comprising the digits which may indicate the presence of a fine increment.

In the binary notation used for the signals in the θ-register 38, a fine increment has the value 000000000000010100011000 and a coarse increment has the value 000000000101000101111101. Whenever an Fo signal or a Co signal has been set up (and not canceled), then during the second quarter of the iteration period gates of the increment value insertion circuit 160 open to apply the appropriate one of these numbers to the adder/subtractor circuit 114, in synchronism with the digit signals of corresponding significance from the θ -register 38. The adder/subtractor circuit 114 is controlled by one or the other of the complementary increment sign signals So and $\overline{So}$ so that it either adds the increment value to the representation of θ if the increment is positive, or subtracts the increment value from the representation of θ if the increment is negative. The output of the adder/subtractor circuit 114 is entered through the gates 118 and 117 into the θ-register 38.

The pushbutton contactor 121, gate 122 and bistable circuit 120 provide a means for temporarily interrupting the computations, which may be convenient for displaying or checking the calculated values or testing the apparatus. The increment detection operations are also interrupted, and the θ-register 38 is cleared, by any resetting operation since the gates 115 and 133 can only open when the signal $\overline{R}$ is applied to them.

To keep the description hereinabove as simple as possible, an embodiment has been described in which the logic circuits are formed of AND-gates and OR-gates. It should be clearly understood that this embodiment has been described by way of example only, as many variations and modifications thereof will now be obvious to persons skilled in the art.

For instance, it will be realized that equivalent logic circuits may be formed of NAND-gates and NOR-gates, and alternative arrangements of this type may have various practical advantages, although the number of signal inversions involved tends to make their operation more difficult to follow and to describe. Some of the signal inversions may be compensated by interchanging the connections to some of the bistable circuits. It may be advantageous to employ bistable circuits of a type responsive to a 0-digit signal, which may for instance be put into the 1-state by a 0-digit signal applied to what might otherwise be called its O-state setting input. The increment detection could be performed later in the iteration period, and the increment value addition delayed by one iteration period, to bring the stored values of θ, sin θ, and cos θ more closely up to date and consistent with each other. Multiplexing arrangements may be provided, so that the analyzer may be sequentially switched to calculate the sines and cosines of a plurality of angles measured by different angle encoders.

We claim:

1. A digital differential analyzer for calculating a specified function of an independent variable, comprising:

input means for providing a digital representation of a sample value of the independent variable and a digital representation of an increment therein;

first storage means for temporarily storing a digital representation of a previously calculated value of the function;

computing means connected to the input means and to the first storage means for forming a digital representation of the sum of the first $n$ terms of a Taylor series expansion of the function with the substitution therein of the said increment and the said previously calculated value, thereby forming a new representation of an approximation to the value of the function corresponding to the sampled value of the variable; and means for replacing the aforesaid representation of the previously calculated value stored in the first storage means by the said new representation formed by the computing means wherein $n$ is an odd integer greater than unity.

2. A digital differential analyzer for calculating a function of a variable, comprising:

first storage means for temporarily storing a digital representation of a previously calculated value of the function;

second storage means for temporarily storing a representation of a value of the independent variable associated with a preceding calculation;

sample input means for providing a representation of a sample value of the variable;

increment-detecting means connected to the sample input means and to the second storage means, for comparing the representation stored in the second storage means with the representation provided by the sample input means, providing an increment sign signal indicative of the sign of the difference between the said sample value and the said value associated with a preceding calculation and providing an increment size signal indicative of whichever one of two predetermined standard increment sizes has a magnitude nearer to the magnitude of the said difference, and computing means, connected to the first storage means and to the increment-detecting means and responsive to the increment sign signal and to the increment size signal, for forming a digital representative of the sum of the first $n$ terms of a Taylor series expansion of the function with the substitution therein of an increment in the value of the variable having the sign indicated by the increment sign signal and a magnitude equal to the magnitude of the said one of the two predetermined standard increment sizes, and also for altering the representations in the first storage means and the second storage means to represent the effect of the said increment on the value of the variable.

3. A digital differential analyzer as claimed in claim 2 and wherein the first storage means includes a first shift register, the computing means is connected to the first shift register to receive signals sequentially through an output thereof for making a serial digit-by-digit calculation of the new value of the function, and there is provided a timing signal means connected to a shift control input of the first shift register, to the input means and to the computing means for synchronizing the operations thereof.

4. A digital differential analyzer as claimed in claim 2 and wherein:

the second storage means comprises a second shift register;
the sample input means comprises a third shift register;
there is provided a timing signal means connected to shift control inputs of the second shift register and the third shift register; and
the increment detecting means is connected to one output connection of the second shift register and one output connection of the third shift register for making a serial digit-by-digit comparison of digital representations stored therein.

5. A digital differential analyzer as claimed in claim 4 and wherein the increment-detecting means comprises a subtractor circuit means connected to the said output connection of the second shift register and the said output connection of the third shift register and to the timing signal means for successively forming difference signals representing digits of the said difference, and a plurality of gate circuits connected to the subtractor circuit means and connected to the timing signal means and controlled thereby to provide a fine-increment-indicating signal whenever the magnitude of the said difference is greater than a first predetermined magnitude and to provide a coarse-increment-indicating signal whenever the said difference is greater than a second predetermined magnitude.

6. A digital differential analyzer as claimed in claim 3 and wherein the first shift register has an output connection connected from an intermediate stage of the first shift register and to the computing means to provide it with signals representing the product of a stored value multiplied by a predetermined multiplier.

7. A digital differential analyzer as claimed in claim 6, wherein the digital representations of the increments and the values of the function comprise ordered sets of binary digit-signals, of which a first digit-signal is a sign-indicating signal which is a zero signal in representations of positive values and is a 1-signal in representations of negative values; of which a second digit-signal may be a 0-signal of unit significance representing zero units or a 1-signal which represents minus unity in representations of negative values; a third digit signal of half-unit significance which will represent plus one-half unit in all representations where it is a 1-signal and a plurality of binary digit-signals of consecutively decreasing significance which represent positive binary fractional quantities in all representations; and wherein the computing means comprises a sign digit repeater means connected to the timing signal means for causing repetitions of the sign indicating signal in any subtrahend formed by a shift in the direction of decreasing significance.

8. A digital differential analyzer as claimed in claim 6, wherein the first shift register has a first output connection and a second output connection connected to different intermediate stages of the first shift register, the computing means comprises a first gate connected to the said first output connection and a second gate connected to the said second output connection, and the said first gate and the said second gate are both connected to the increment detecting means so as to be opened by different increment size signals provided by the increment detecting means.

9. A digital differential analyzer as claimed in claim 3 and wherein the computing means comprises an adder/subtractor circuit and a plurality of gate circuits connected to the adder/subtractor circuit and to the timing signal means.

10. A digital differential analyzer as claimed in claim 9 and wherein the computing means comprises a sequence control means connected to the timing signal means and connected to the increment-detecting means to receive the increment sign signal therefrom, for controlling the adder/subtractor circuit so that it performs additions and subtractions in a first predetermined sequence whenever the increment sign signal indicates the occurrence of a positive increment and in a second predetermined sequence whenever the increment sign signal indicates the occurrence of a negative increment.

11. A digital differential analyzer as claimed in claim 2 for calculating sine and cosine functions of an angle which in this case is the independent variable, wherein the said first storage means comprises a shift register for temporarily storing a digital representation of a previously calculated value of the sine of a value of the angle, and the computing means comprises:
  another shift register for temporarily storing a digital representation of a previously calculated value of the cosine of a value of the angle;
  a further shift register for temporarily storing digital representations formed in the course of the calculations;
  a timing signal means having a plurality of outputs for producing a sequence of timing signals, of which at least one output is connected to shift control inputs of the said shift registers;
  a plurality of gate circuits connected to outputs of the timing signal means, to the said shift registers and to the increment detector means;
  an adder/subtractor circuit connected to outputs of the said gate circuits and having an output connected through some of the aforesaid gate circuits to inputs of the said shift registers, and
  a sequence control means which has inputs connected to the timing signal means, at least one input connected to the increment detecting means to receive the increment sign signal therefrom, and at least one output connected to the adder/subtractor circuit for causing it to perform additions and subtractions in a first predetermined sequence whenever the increment sign signal indicates the occurrence of a positive increment and in a second predetermined sequence whenever the increment sign signal indicates the occurrence of a negative increment.

12. A digital differential analyzer as claimed in claim 11 and comprising resetting means for resetting the first shift register, the second shift register, and the said another shift register to representations of zero, zero and unity respectively.

13. A digital differential analyzer as claimed in claim 11 wherein the said plurality of gate circuits comprises:
  a first gate circuit connected in a signal path from the last stage to the first stage of the said first shift register;
  a second gate circuit connected in a signal path from the last stage of the first shift register to an input of the adder/subtractor circuit;
  a third gate circuit connected in a signal path from the last stage to the first stage of the said another shift register;
  a fourth gate circuit connected in a signal path from the last stage of the said another shift register to an input of the adder/subtractor circuit;
  a fifth gate circuit connected in a signal path from an output of the adder/subtractor circuit to the first stage of the first shift register;
  a sixth gate circuit connected in a signal path from the output of the adder/subtractor circuit to the first stage of the said further shift register;
  a seventh gate circuit connected in a signal path from the output of the adder/subtractor circuit to the first stage of the said another shift register;
  an eighth gate circuit having two inputs connected to different stages of the first shift register;
  a ninth gate circuit having two inputs connected to different stages of the said further shift register;
  a 10th gate circuit having two inputs connected to different stages of the said another shift register;
  wherein outputs of the eighth, ninth and 10th gate circuits have outputs connected to an input of the adder/subtractor circuit, and have inputs connected to the increment detector means to receive increment size signals therefrom; and
  wherein the first, second, third, fourth, fifth, sixth, seventh, eighth, ninth and 10th gate circuits all have inputs connected to various outputs of the timing signal means.

14. A digital differential analyzer as claimed in claim 13 and comprising a sign digit repeater circuit connected in the signal path from the outputs of the eighth, ninth and 10th gate circuits to the adder/subtractor circuit, connected to the timing signal means and connected to the increment detecting means to receive at least one increment size signal therefrom.

15. A digital differential analyzer as claimed in claim 13 and wherein each of the eighth, ninth and 10th gate circuits comprises:
  a first AND-gate having an input connected to an intermediate stage of a shift register and an input connected to the increment detecting means so that it will transmit signals from the said intermediate stage when an increment size signal indicative of a fine increment is produced;
  a second AND-gate having an input connected to a stage of the shift register later than the said intermediate stage and an input connected to the increment detecting means so that it will transmit signals from the later stage when an increment size signal indicative of a coarse increment is produced; and
  a third AND-gate connected to receive signals from the output of the first AND-gate, the output of the second AND-gate, and at least one output of the timing signal means.